Figure 1:
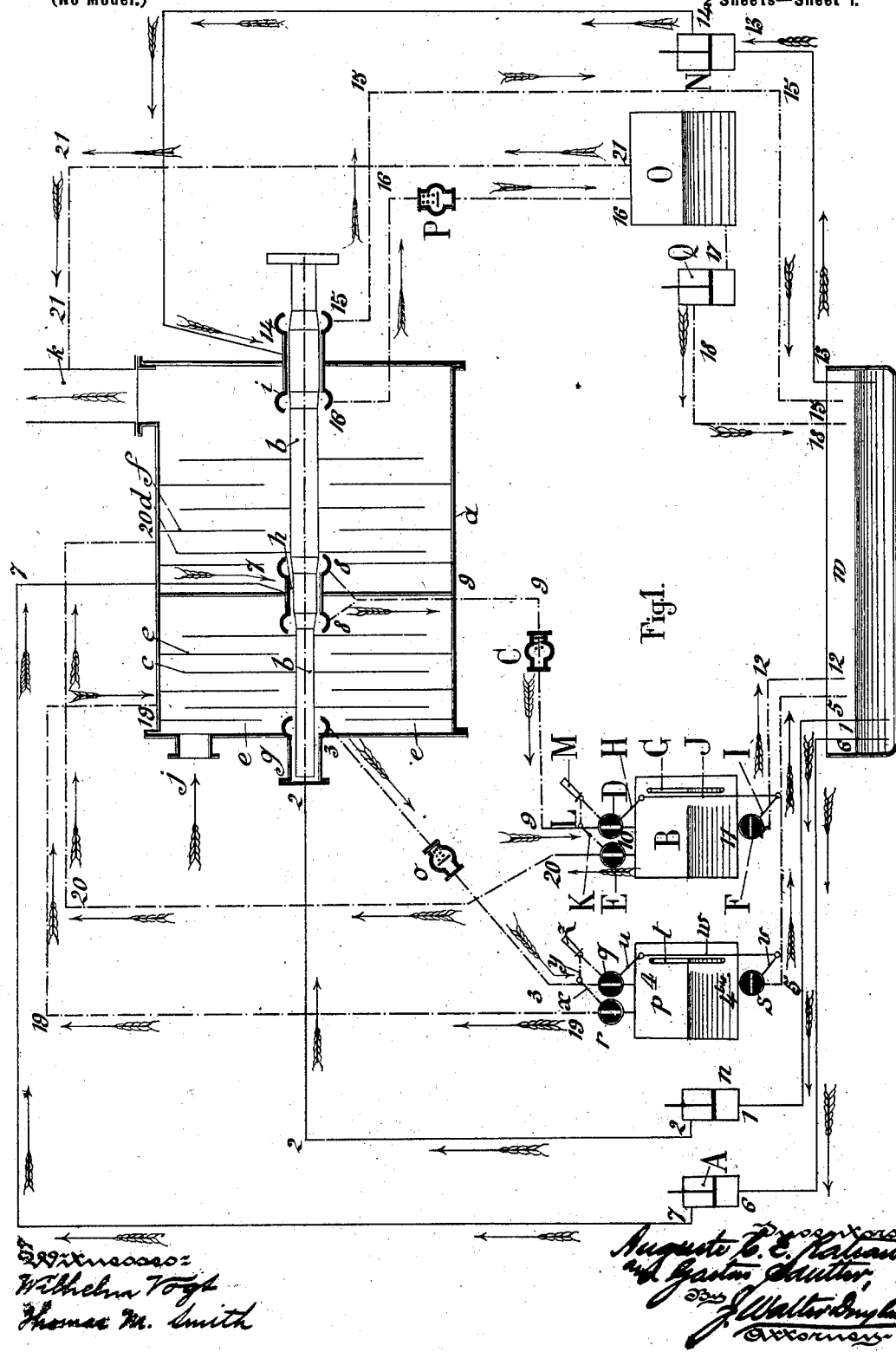

No. 691,914. Patented Jan. 28, 1902.
A..C. E. RATEAU & G. SAUTTER.
LUBRICATING STEAM TURBINES, &c.
(Application filed Aug. 1, 1901.)
(No Model.) 2 Sheets—Sheet 1.

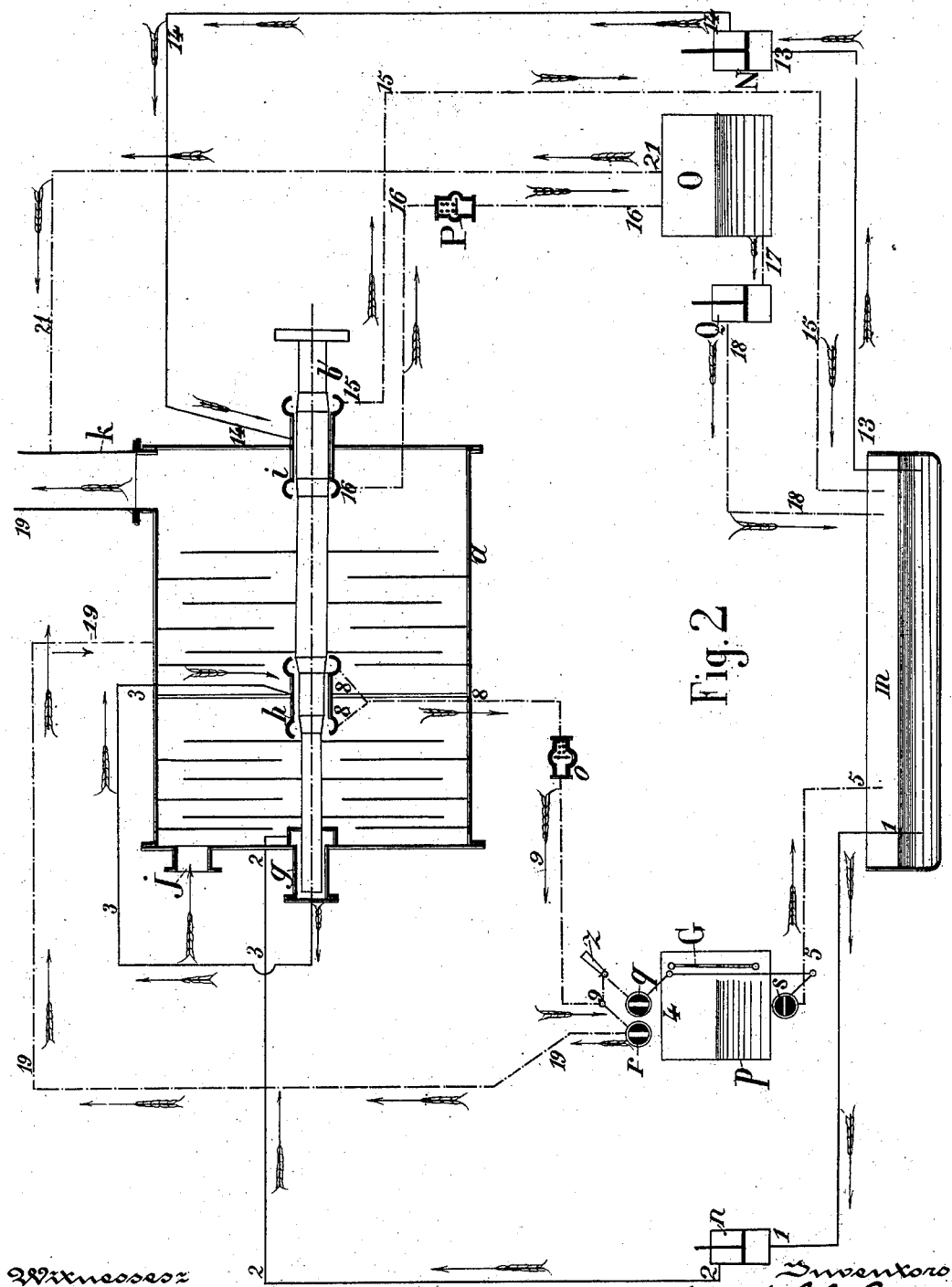

UNITED STATES PATENT OFFICE.

AUGUSTE CAMILLE EDMOND RATEAU AND GASTON SAUTTER, OF PARIS, FRANCE.

LUBRICATING STEAM-TURBINES, &c.

SPECIFICATION forming part of Letters Patent No. 691,914, dated January 28, 1902.

Application filed August 1, 1901. Serial No. 70,439. (No model.)

*To all whom it may concern:*

Be it known that we, AUGUSTE CAMILLE EDMOND RATEAU and GASTON SAUTTER, citizens of the Republic of France, and residents of Paris, France, have jointly invented certain new and useful Improvements in Lubricating Steam-Turbines or Similar Apparatus, of which the following is a specification.

In piston-engines having one or more cylinders it is necessary to continuously lubricate the pistons while they are in motion. The method most usually adopted consists in adding lubricant to the steam at the moment of its passage into the cylinder. Lubrication should be the more thorough the higher the pressure. All the rubbing portions of the engine—such as the joints of the connecting-rods, the cranks, and the shaft-bearings—should be continuously lubricated, as well as the pistons. In steam-turbines it is only the bearings which require lubrication. In these engines the steam acts upon the paddle-blades of one or several rotating disks keyed upon the same shaft. There are therefore in steam-turbines no rubbing parts except the bearings of the shaft. It is consequently not necessary to add lubricant to the steam, the disks of the turbines not rubbing against any metal part. All addition of lubricant to the steam being unnecessary, the object to be attained is to prevent any portion of the lubricating-oil passing into the engine itself and being carried by the steam into the condenser. When surface condensers are used, the disadvantages of mixing oil with the steam are well known. With piston-engines, as it is necessary to lubricate the cylinders, it is unavoidable for some oil to be carried to the condensers. With steam-turbines this defect may be entirely avoided, for it being unnecessary to lubricate the driving parts no oil need be added to the steam. In steam-turbines, it being alone necessary to lubricate the bearings, two processes are indicated—either the bearings must be external and placed out of the path of the steam or the bearings must be inside the engine and surrounded by the steam. This invention relates to the second of these methods of lubrication—that is to say, to the use of bearings placed inside the engine.

The nature and scope of our invention will be more fully understood from the following description, taken in connection with the accompanying drawings, forming part hereof, in which—

Figure 1 is a diagrammatic view showing the general arrangement of an apparatus embodying the main features of our invention; and Fig. 2 is a similar view, but illustrating a modification which allows the number of the parts to be reduced.

Referring to Fig. 1 of the drawings, $a$ shows the outer metal casing of a multicellular steam-turbine. $b$ is the shaft of the turbine, carrying a series of disks keyed to the same. $c\ d$ are the moving disks, keyed to the shaft. $e\ f$ are diaphragms separating the various disks and which are fixed to the outer casing. $g$ is the bearing on the high-pressure side, placed inside the turbine, and into which the end of the shaft $b$ passes. $h$ is an intermediate bearing. $i$ is the shaft-bearing placed on the condenser side. $j$ is the inlet for the high-pressure steam. $k$ is the outlet for the steam into the condenser. This system of lubrication has for its object to lubricate the three bearings $g\ h\ i$. It includes several reservoirs, circulating-pumps, and a series of pipes, which are shown diagrammatically in the drawings in full and dotted lines. $m$ is a common reservoir containing the lubricating-oil from which the circulating-pumps obtain their supply. 1 is a suction-pipe leading oil from the reservoir $m$ to the pump $n$. $n$ is a pump supplying oil to the bearing $g$. 2 is a pipe through which oil is forced by the pump $n$ to the bearing $g$. 3 is a pipe through which oil passing out from the bearing $g$ is led. $o$ is a non-return valve on the pipe 3. $p$ is an intermediate oil-reservoir. $q$ is a two-way cock placed at one end of the pipe 3. $r$ is a cock similar to $q$ on the reservoir $p$. $s$ is also a two-way cock similar to $q$ and situated underneath the reservoir $p$. $t$ is a level-indicator in glass, showing the level of the lubricating-oil in the reservoir $p$. 4 is the outlet-orifice from the pipe 3 into the reservoir $p$. $u\ v$ are the levers for operating the cocks $q\ s$. $w$ is a rod connecting the levers $u\ v$ together. $x\ y$ represent a connecting-rod and a lever connecting the cocks $q\ r$ together. $z$ is a hand-lever for operating the three cocks $q\ r\ s$. $4^b$ is an orifice for leading oil from the reservoir $p$ to the cock $s$. 5 is a pipe which leads oil passing through the cock $s$ into the reservoir $m$. 6 is a pipe leading oil from the reservoir $m$ to the pump A. A is the pump circulating oil to the bearing $h$. 8 represents pipes through which oil from the bearing $h$ passes. 7 is a pipe through which oil is forced by the pump A to the bearing $h$. B is a reservoir for oil arranged intermediately of the bearing $h$ and reservoir $m$. 9 is a pipe leading oil from the bearing $h$ to the reservoir B. C is a non-return valve on the pipe 9. D E are two-way cocks on the reservoir B. F is a two-way cock situated below the reservoir B. G is a level-indicator showing the level of the oil in the reservoir B. H I J K L are levers and connecting-rods connecting the cocks D E F together. M is a hand-lever for operating these cocks. 10 is the outlet-orifice from the pipe 9 into the reservoir B. 11 is the orifice for allowing oil to pass out of the reservoir B. 12 is a pipe for returning oil from the reservoir B into the reservoir $m$. 13 is a suction-pipe for leading oil from the reservoir $m$ to the pump N. N is the pump circulating oil to the bearing $i$. 14 is the pipe through which oil is forced by the pump N into the bearing $i$. 15 is a pipe for returning oil from the bearing $i$ into the reservoir $m$. 16 is a pipe leading oil from the bearing $i$ into the reservoir O. P is a non-return valve on the pipe 16. O is an air-reservoir for the oil from the bearing $i$. 17 is a pipe leading oil from the reservoir O into the pump Q. Q is a pump sucking oil from the reservoir O. 18 is a pipe connecting the pump Q with the reservoir $m$. 19 is a pipe connecting the reservoir $p$ with one cell of the multicellular turbines. A cock $r$ is on this pipe. 20 is a pipe connecting the reservoir B to one cell of the multicellular turbine. 21 is a pipe connecting the reservoir O with the outlet-orifice to the condenser $k$.

In the modification shown in Fig. 2 oil passing out from the bearing $g$ is led into the intermediate bearing $h$. There is therefore only one force-pipe and return-pipe to lubricate the bearings $g$ and $h$. In this form of the apparatus, $m$ is the common lubricant-reservoir; 1, the suction-pipe of the pump $n$; $n$, the pump circulating oil to the bearings $g$ and $h$. 2 is the force-pipe of the pump $n$, leading into the bearing $g$. 3 is the pipe leading oil from the bearing $g$ into the bearing $h$. 8 9 are pipes leading oil from the bearing $h$ and which are provided with a non-return valve $o$. $o$ is a non-return valve. $p$ is an intermediate reservoir into which oil returned from the bearings $g$ and $h$ is led. $q\ r\ s$ are three similar cocks placed on the intermediate reservoir $p$. $z$ is a hand-lever operating the three cocks $q\ r\ s$. 5 is a pipe returning oil from the reservoir $p$ into the reservoir $m$. 19 is a pipe leading from the cock $r$ of the intermediate reservoir to a cell of the multicellular turbine at the right of the bearing $h$. The bearing $i$ in the modification shown in Fig. 2 is lubricated in an identical manner to that shown in Fig. 1.

The same characters designate the same parts.

The operation of the device is as follows: Suppose the multicellular steam-turbine to be in motion. High-pressure steam passes in at the orifice $j$, whence it is distributed onto the first rotating disks. From the first disk it passes to the second disk, first passing through a second distributer, and so on until the end of the turbine. The steam expands successively, and its pressure decreases continuously from the inlet-orifice $j$ to the outlet at $k$ into the condenser. Each of the three bearings $g\ h\ i$ are therefore acted upon by decreasing pressures. The bearing $g$ is at the pressure of the steam at its inlet, the bearing $h$ is at a less pressure, and the bearing $i$ is at the pressure in the condenser. The bearings $g$ and $h$ are entirely surrounded by steam. The bearing $i$ forms at the same time a liquid seal for that portion of the shaft passing out of the engine.

The circulation of the oil is obtained by means of three pumps $n$ A N, which force oil into one of the bearings $g\ h\ i$. These pumps are driven by an engine, (not shown in the drawings,) and they may be combined together in any desired manner. If desired, each pump may be driven by a separate engine or by the steam-turbine itself. The fourth pump Q draws oil from the reservoir O, in which it is exposed to a pressure less than atmospheric. The arrangement in the figures supposes normal working of the machine. A continuous current of oil flows through the bearing $g$. The path of the oil, which is shown by the arrows, is through the pipes 1 2 3 4 5. The pump $n$ sucks oil from the reservoir and forces it at a pressure which should be at least equal to that of the steam acting upon the bearing $g$. The oil passing out of the bearing $g$ flows into the reservoir $p$, which collects it, the pressure in the reservoir $p$ being lower than the pressure of steam acting upon the bearing $g$. This is so because the upper portion of the reservoir $p$ is in communication through the pipe 19 and the cock $r$ with a portion of the turbine at a point at which the pressure of the steam is less than at its inlet $j$, because it has already expanded while acting on one or more moving disks. The oil which passes out from the bearing $g$ and which is at the maximum pressure of the steam is therefore, of course, forced toward the reservoir $p$, in which the pressure is less than that acting upon the bearing. The oil therefore has no tendency to pass from the bearing $g$ into the engine, from whence it would be carried along by the steam into the condenser. At the end of a certain time when it is seen that the reservoir $p$ is full the lever $z$ is rotated, closing the cocks $q\ r$. This movement opens the cock $s$, and the pressure in the reservoir $p$, which is greater than atmospheric pressure, forces the oil through the pipe 5 into the common reservoir m. This done, the cocks q r are opened and the cock s closed by means of the hand-lever z. Connecting these three cocks together prevents any false working, while if they were not so connected it might happen that the oil in the reservoir p might be suddenly driven into the engine, which is just what it is necessary to avoid.

The lubrication of the bearing h by means of the pipes 6 and 7, the pump A, the return-pipes 9 10, the reservoir B, and the cocks D E F takes place in the same manner as for the bearing g. The upper portion of the reservoir B is in communication through the pipe 20 with a point of the turbine at which the pressure of steam is lower than that acting upon the bearing h. The same thing occurs in lubricating the bearing h, and the reservoir B is emptied in the same manner.

The bearing i is lubricated in a slightly-different manner. First, the end of this bearing is acted upon by the pressure in the condenser or a slightly-different pressure, but by pressure always less than atmospheric pressure. The pipes 13 14, through which oil is forced into the bearing by the circulating-pump N, are arranged in the same way as in the other bearings; but the oil flows out of the bearing at both ends. The oil in its passage into the bearing i is given its pressure by the pump N. This pressure is greater than atmospheric pressure. The oil would therefore prevent the entrance of air through the end of the bearing i, thus forming a liquid seal. When the oil arrives at the outer end of the bearing, it of course flows out through the pipe 15 and passes directly into the reservoir m. In any case the greater quantity of oil is diffused in the bearing as far as the inner end. It will therefore have a tendency to fall into the engine, because the pressure acting upon the end of this bearing is lower than atmospheric pressure.

16 is the return-pipe from the bearing. It opens out into the reservoir O. This reservoir is kept at a pressure lower than atmospheric pressure by means of the pump Q, which sucks the oil which accumulates there and forces it through the pipe 18 into the common reservoir m. The oil in the bearing i is sucked into the air-reservoir O by the pressure inside this reservoir, which is less than that at the inlet into the bearing i. The pipe 21 connects the reservoir O with the outlet from the turbine into the condenser—that is to say, with a point at which the pressure is lower than that acting upon the bearing i. The working of the pump Q is, moreover, regulated in such a manner as to maintain in the reservoir O a pressure lower than that acting upon the bearing i. By means of this arrangement the lubrication of the bearing i is insured in as complete a manner as that of the bearings g h, the oil being prevented from falling inside the turbine and being drawn into the condenser.

The working above described is for the normal working. At the moment at which the engine is stopping, when steam is prevented from entering the engine at j, the pressure there commences to become equalized with that of the condenser. Under these conditions as the reservoirs p and B are still at a pressure considerably higher than atmospheric pressure the oil will have a tendency to pass through the pipes 3 9 in a contrary direction to the path it has previously traversed. It would thus pass into the turbine. The valves o C on the return-pipe from the bearings prevent this retrograde movement and prevent the oil passing into the engine at the moment of stopping. This might also occur through the return-pipe from the bearing i to the reservoir O. The valve P will prevent this return movement through the pipe 16 in the same way as valves o C do in the other two bearings.

Fig. 2 shows a modification of the preceding arrangement. A single pipe is sufficient to lubricate the bearings g h. The oil forced by the pump n passes through the pipe 2, the bearing g, the pipe 3, and the bearing h and returns through the pipes 8 and 9 into the reservoir p. The lubricating-oil is forced to pass from the bearing g to the bearing h by the difference of pressure existing at the point g and at the point h. This simplification allows the elimination of one of the circulating-pumps in Fig. 1 and one of the intermediate reservoirs. It may, moreover, be applied to turbines in which there is not one but several intermediate bearings. They will for lubricating be all connected in series with the bearing g and would have a single common return, a single circulating-pump, and a single intermediate reservoir. The principle of the lubrication is the same as that in Fig. 1. The intermediate reservoir is emptied in the same way, and the bearing i is lubricated identically in the same manner to that in Fig. 1.

Having thus described the nature and object of our invention, what we claim as new, and desire to secure by Letters Patent, is—

1. A device for lubricating inside bearings of multicellular steam-turbines or the like, said bearings being severally under varying pressures of steam, said device consisting of means for forcing oil under a pressure greater than the pressure upon the bearing supplied with oil, a reservoir, pipe connections leading from the bearing to said reservoir, and a pipe connecting said reservoir with a cell of the turbine in which the steam-pressure is less than the pressure upon the bearing to which the oil is forced, whereby the oil is discharged into the reservoir from the bearing and is prevented from entering the turbine.

2. A device for lubricating the bearing at the outlet or condenser end of a multicellular steam-turbine, said bearing having one face exposed to atmospheric pressure and the other face to a pressure in the condenser less than atmospheric pressure, said device consisting of means for forcing oil to the bearing under a pressure greater than atmospheric pressure, a pipe connection leading from the inner face of the bearing, a reservoir, means for maintaining said reservoir under a pressure less than atmospheric pressure into which said pipe connection discharges, a second pipe connection leading from the outer end of the bearing and a second reservoir under normal atmospheric pressure into which said second pipe connection discharges.

3. A device for lubricating a series of inside bearings of a multicellular steam-turbine, said bearings being subjected severally to different steam-pressures within the turbine, said device consisting of means for forcing oil to that bearing in series upon which the pressure is greatest and under a pressure greater than said greatest pressure, oil-pipes connecting the bearings in series to permit the oil supplied to the first bearing to circulate through all the bearings successively from the bearing under highest to the bearing under lowest pressure, a pipe connection leading from the bearing under lowest pressure, a reservoir into which said pipe connection discharges, and means for maintaining said reservoir under a pressure less than the pressure upon the last bearing in series.

In testimony whereof we have signed this specification in the presence of two subscribing witnesses.

AUGUSTE CAMILLE EDMOND RATEAU.
GASTON SAUTTER.

Witnesses:
PAUL DE MERTSAL,
EDWARD P. MACLEAN.